(12) United States Patent
Dinerstein

(10) Patent No.: US 6,909,748 B2
(45) Date of Patent: Jun. 21, 2005

(54) METHOD AND SYSTEM FOR IMAGE COMPRESSION USING BLOCK SIZE HEURISTICS

(75) Inventor: Jonathan J. Dinerstein, Logan, UT (US)

(73) Assignee: Sorenson Media, Inc., Taylorsville, UT (US)

( * ) Notice: Subject to any disclaimer, the term of this patent is extended or adjusted under 35 U.S.C. 154(b) by 648 days.

(21) Appl. No.: 10/029,142

(22) Filed: Dec. 20, 2001

(65) Prior Publication Data

US 2003/0118101 A1 Jun. 26, 2003

(51) Int. Cl.[7] .......................... H04N 7/12; H04N 11/04; H04N 11/02
(52) U.S. Cl. ...................... 375/240.12; 375/240.21; 375/240.09
(58) Field of Search .................. 375/240.12, 240.21, 375/240.24; 348/416, 413

(56) References Cited

U.S. PATENT DOCUMENTS

| | | | |
|---|---|---|---|
| 5,021,891 A | 6/1991 | Lee |
| 5,107,345 A | 4/1992 | Lee |
| 5,452,104 A | 9/1995 | Lee |
| 5,844,613 A | 12/1998 | Chaddha |
| 5,956,431 A | 9/1999 | Iourcha |
| 5,999,655 A | 12/1999 | Kalker |
| 6,031,937 A | 2/2000 | Graffagnino |
| 6,084,908 A | 7/2000 | Chiang |
| 6,233,017 B1 | 5/2001 | Chaddha |
| 6,246,719 B1 | 6/2001 | Agarwal |
| 6,272,178 B1 | 8/2001 | Nieweglowski |

OTHER PUBLICATIONS

H26L Specification, ITU–Telecommunications Standardization Sector, Study Group 16, Video Coding Experts Group, dated Jun. 28, 2001.
H26L Specification, ITU–Telecommunications Standardization Sector, Study Group 16, Video Coding Experts Group, dated May 5, 2000.

*Primary Examiner*—Chris Kelley
*Assistant Examiner*—Charles Parsons
(74) *Attorney, Agent, or Firm*—TraskBritt

(57) ABSTRACT

The present invention includes a method and system for image compression using block size heuristics. A method for motion searching a video frame is disclosed including iteratively decreasing block size until a rate-distortion (RD) has been minimized. A method for compressing motion video images is disclosed. Additionally, a system for transmitting and receiving video images is disclosed. The system may be a video conferencing system.

19 Claims, 4 Drawing Sheets

METHOD AND SYSTEM FOR IMAGE COMPRESSION USING BLOCK SIZE HEURISTICS

FIELD OF THE INVENTION

The present invention relates generally to image compression techniques applicable to motion video. More specifically, the present invention includes a method and system for image compression using block size heuristics to improve speed for motion search.

BACKGROUND OF THE INVENTION

Digital video products and services such as digital satellite service and video streaming over the Internet are becoming increasingly popular and drawing significant attention in the marketplace. Because of limitations in digital signal storage capacity and in network and broadcast bandwidth transmission limitations, there has been a need for compression of digital video signals for efficient storage and transmission of video images. For this reason, many standards for compression and encoding of digital video signals have been developed. For example, the International Telecommunication Union (ITU) has promulgated the H.261, H.263 and H.26L standards for digital video encoding. Additionally, the International Standards Organization (ISO) has promulgated the Motion Picture Experts Group (MPEG) MPEG-1 and MPEG-2 standards for digital video encoding.

These standards specify with particularity the form of encoded digital video signals and how such signals are to be decoded for presentation to a viewer. However, significant discretion is allowed for selecting how digital video signals are transformed from uncompressed format to a compressed, or encoded format. For this reason, there are many different digital video signal encoders available today. These various digital video signal encoders may achieve varying degrees of compression.

It is desirable for a digital video signal encoder to achieve a high degree of compression without significant loss of image quality. Video signal compression is generally achieved by representing identical or similar portions of an image as infrequently as possible to avoid redundancy. A digital motion video image, which may be referred to as a "video stream", may be organized hierarchically into groups of pictures which includes one or more frames, each of which may represent a single image of a sequence of images of the video stream. All frames may be compressed by reducing redundancy of image data within a single frame. Motion-compensated frames may be further compressed by reducing redundancy of image data within a sequence of frames.

Motion video compression may be based on the assumption that little change occurs between frames. This is frequently the case for many video signals. This assumption may be used to improve motion video compression because a significant quantity of picture information may be obtained from the previous frame. In this way, only the portions of the picture that have changed need to be stored or transmitted.

Each video frame may include a number of macroblocks that define respective portions of the video image of the video frame. The term macroblock refers to a "16×16" pixel region. Other block sizes, i.e., 8×16, 16×8, 8×8, 4×8, 8×4 and 4×4, are derived by subdividing the 16×16 macroblock. A motion vector may be used in mapping blocks from one video frame to corresponding blocks of a temporally displaced video frame. A motion vector maps a spatial displacement within the temporally displaced frame of a relatively closely correlated block of picture elements, or pixels. In frames in which subject matter is moving, motion vectors representing spatial displacement may identify a corresponding block that matches a previous block rather closely.

This is also true when the video sequence includes a camera pan, i.e., a generally uniform spatial displacement of the entirety of the subject matter of the motion video image. In a camera pan, most of the picture information from the previous frame may still be the same, but it may be at a new location in the current picture frame. It is important to know where objects in the current video frame have moved relative to the previous video frame so that as much information can be carried forward from the previous frame as possible. A search to determine where motion has taken place from a reference frame to a current frame is known as "motion estimation".

Motion estimation may be obtained by calculating the similarity between two identically placed regions in the previous and current video frames. To calculate the difference, the sum of absolute differences (SAD) may be used. The result of the SAD is often called "distortion", as it measures how different two areas of the previous and current frames are. Distortion may be computed as:

$$\text{distortion} = \sum |\text{previous}(x,y) - \text{current}(x,y)| \quad (1)$$

where, previous (x,y) is the location of a previous frame of video and current (x,y) is the location of a current frame of video. Rate-distortion means to consider not only the similarity in the picture regions, how large of a vector the motion has, i.e., how far an object has traveled. This vector must be stored, and therefore is a cost that must be considered. For this reason, motion estimation is usually performed by a motion search for many nearby locations (i.e., the motion vector is not too long). The optimal solution is found by comparing the rate-distortions of all possible choices.

Of course, change in the picture from frame to frame will not only happen because of camera motion. Objects within a video frame can also move, e.g., a stationary camera recording a person who is walking past the frame of view. In cases such as this, it is possible that only small regions of the picture have moved, and other small regions have remained in place. Further, for video content such as sports, it's possible for many small objects to be moving in different directions.

Motion estimation must be capable of dealing with both coarse-grain motion (large objects moving or camera pan) and fine-grain motion (small objects moving). For this reason, H.26L uses 7 different sizes of regions to estimate motion. These are usually called blocks. These sizes include: 16×16, 8×16, 16×8, 8×8, 4×8, 8×4 and 4×4. The larger block sizes are for coarse-grain motion, the smaller block sizes for fine-grain motion. These sizes are in terms of pixels (individual color dots in the picture). However, performing a motion search for all of these block sizes is very expensive. H.26L states that a motion search should be performed for all of them, but we have discovered a better way.

It is important to note that smaller block sizes are more expensive to store than larger block sizes because each block has a motion vector. In other words, an entire 16×16 region can be described with a single motion vector, whereas the same region divided into 4×4 blocks needs 16 motion vectors. Because of this and the fact that most motion in video is coarse-grain, the 16×16 block size is usually selected as the best or preferred block size.

While there are sophisticated methods for performing image compression, they tend to be expensive. Thus, there still exists a need in the art for a method and system for image compression that reduces computational complexity and increases speed of motion video image compression.

SUMMARY OF THE INVENTION

The present invention includes a method and system for image compression using block size heuristics. A method for motion searching a video frame is disclosed including iteratively decreasing block size until a rate-distortion (RD) has been minimized. A method for compressing motion video images is disclosed. Additionally, a system for transmitting and receiving video images is disclosed. The system may be a video conferencing system.

These embodiments of the present invention will be readily understood by one of ordinary skill in the art by reading the following detailed description in conjunction with the accompanying figures of the drawings.

DESCRIPTION OF THE DRAWINGS

The drawings illustrate what is currently regarded as a best mode for carrying out the invention. Additionally, like reference numerals refer to like parts in different views or embodiments of the drawings.

DETAILED DESCRIPTION OF THE INVENTION

The present invention includes a method and system for image compression using block size heuristics. In the following detailed description, for purposes of explanation, specific details are set forth in order to provide a thorough understanding of the present invention. It will be evident, however, to one of ordinary skill in the art that the present invention may be practiced without these specific details.

Figure 1:
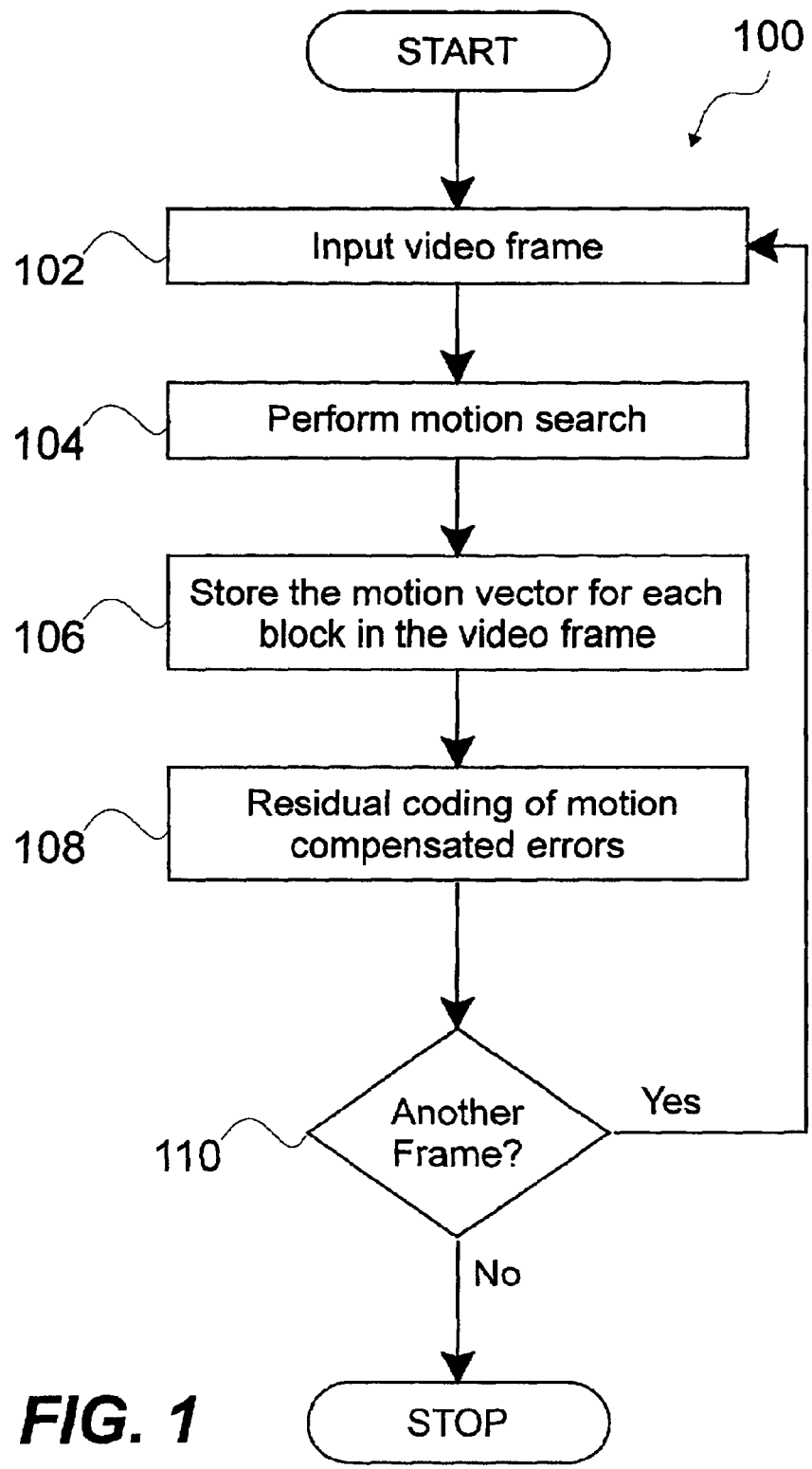
FIG. 1 is a block diagram of a method of compressing a video image in accordance with the present invention.

FIG. 1 is a block diagram of a method 100 of compressing a video image in accordance with the present invention. Method 100 includes inputting 102 a motion video frame for processing and performing 104 a motion search as discussed in greater detail with regard to FIGS. 2A and 2B, below. Method 100 may also include storing 106 the motion vector for each block in the video frame and residual coding 108 of motion compensated errors. Method 100 may be repeated 110 as shown in FIG. 1 if there are additional frames to process.

An important aspect of the inventive block size heuristics is that distortion of the video image will increase as the block size increases for a given granularity of motion in a given video image. Conversely, as smaller block sizes are used, the macroblock overhead (motion vectors) will become increasingly and unnecessarily expensive. Therefore, the measure of rate-distortion will usually have a clear minimum for a given granularity of motion in a given video image. In the case of coarse-grain motion, which is most common, the minimum on a rate-distortion curve may be for the 16×16 block size and thus, decreasing block size will only increase rate-distortion. However, if fine-grain motion is taking place, the minimum rate-distortion may be for a block size smaller than the 16×16 macroblock. So, it is advantageous to iteratively search for the minimum rate-distortion and terminate the search soon as the rate-distortion curve begins to increase.

Figure 2A:
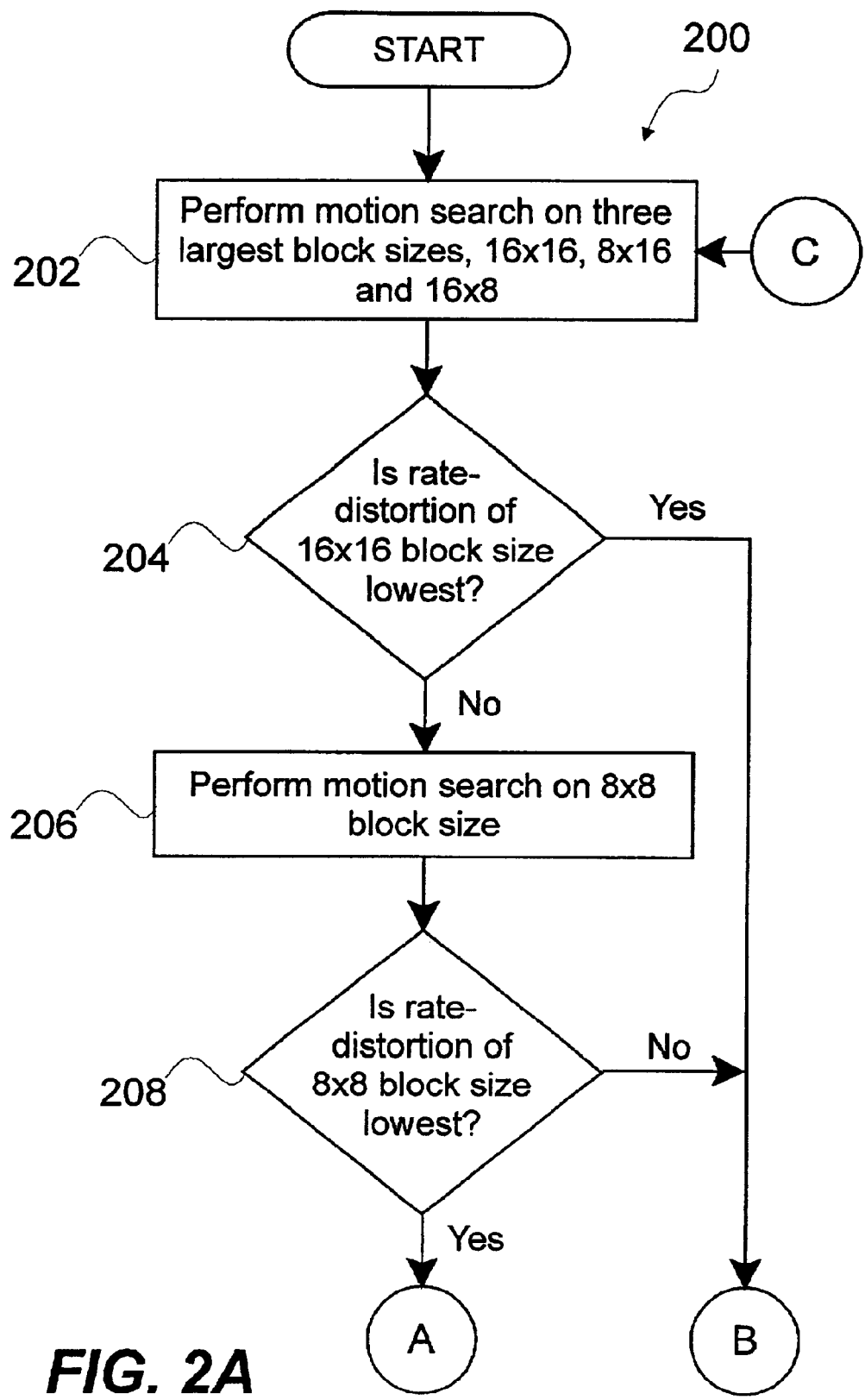
FIGS. 2A and 2B are a flow chart of a method for motion searching a video frame in accordance with the present invention.
Figure 2B:
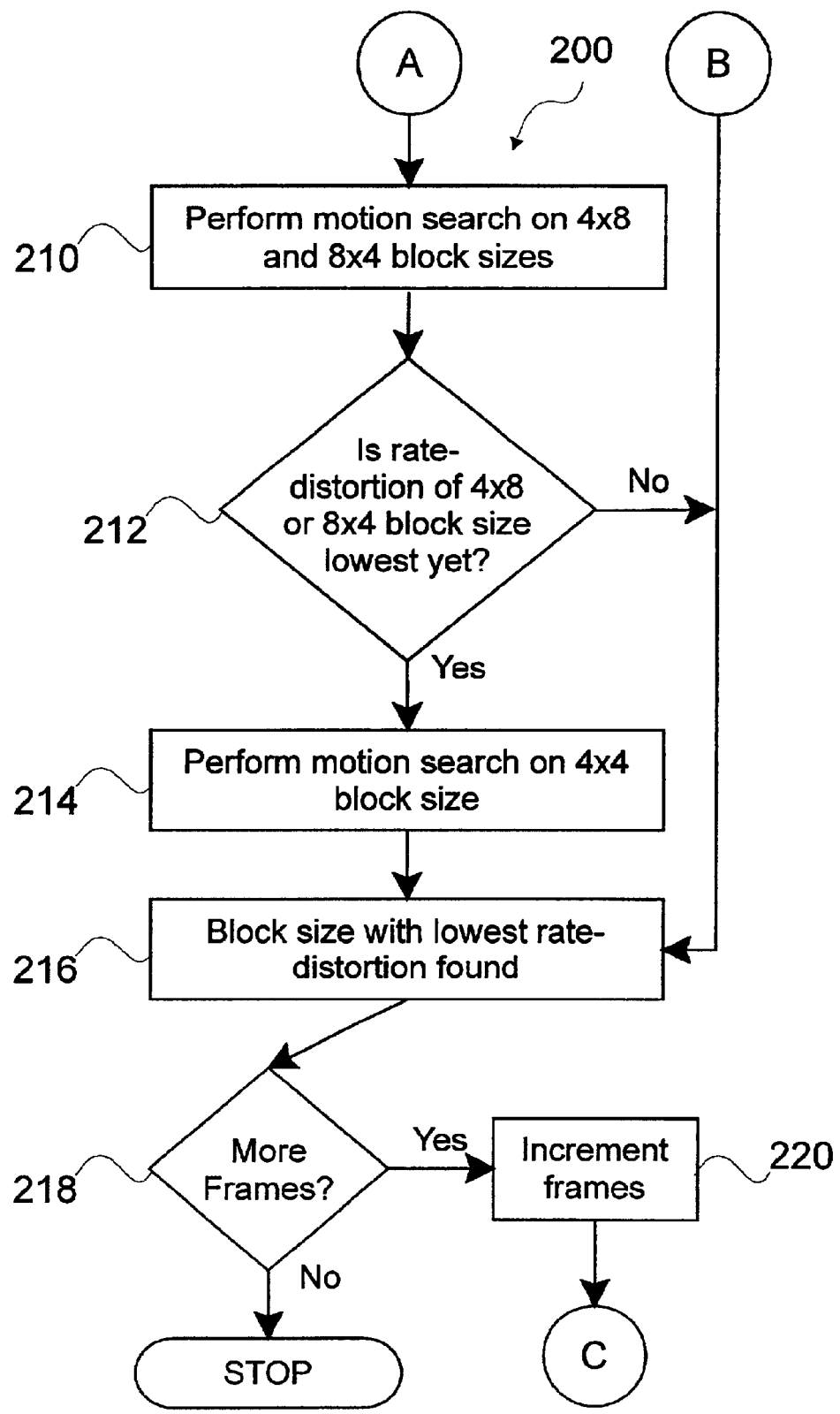

As previously discussed, different block sizes may be used to compensate for fine-grain and coarse-grain motion. It is known that coarse-grain motion compensation (using large block sizes) is most common. Further, the inventor has discovered that, since large blocks are not as efficient for fine-grain motion, the distortion as measured by the SAD will be larger than if small block sizes are used. FIGS. 2A and 2B are a flow chart of a presently preferred method 200 of motion searching a video frame in accordance with the present invention.

Like H.26L, motion searching in accordance with the present invention uses seven block sizes, i.e., 16×16, 8×16, 16×8, 8×8, 4×8, 8×4 and 4×4. Each frame may be partitioned into a number of macroblocks of size 16×16. The macroblocks are subdivided into blocks of sizes 8×16, 16×8, 8×8, 4×8, 8×4 and 4×4 and evaluated for granularity in accordance with the inventive block size heuristic as embodied in method 200. Method 200 is repeated for each macroblock in the current frame. Once all macroblocks have been processed, method 200 may be repeated for a new frame, by incrementing the current frame to a previous frame and obtaining a new frame.

Method 200 includes performing 202 a motion search for each of the three largest block sizes only, i.e., 16×16, 8×16, and 16×8. Method 200 further includes calculating a rate-distortion (RD) for each of the block sizes 16×16, 8×16, and 16×8 and determining 204 whether the RD is lowest for the 16×16 block size. If the RD of the 16×16 block size is lowest, then coarse-grain motion has taken place from the previous to the present video frame. No more motion searching is performed for this particular macroblock because the block size with the lowest RD has been found 216.

In accordance with the present invention, RD may be calculated as follows:

$$RD = n(\text{rate}) + m(\text{distortion}) \qquad (2)$$

where n and m are scalar values used for weighting rate and distortion. Selection of the scalar values, n and m, is within the knowledge of one of ordinary skill in the art and, thus, will not be further elaborated. The rate is the number of bits of storage required for macroblock overhead, such as motion vectors. In other words, rate is a measure of non-pictorial information that must be sent along with the portion of the image that has changed. For example, a macroblock usually has a few pieces of information associated with it: (1) the macroblock type and (2) motion vectors. This information is extra overhead, above and beyond whatever pictorial information must be stored.

The idea behind calculating a RD is to measure the overall predicted cost of storage when taking both of these factors (rate and distortion) into account. The inventive block size heuristic is not dependent on the particular measure of rate or distortion or the RD formed by a linear combination of rate or distortion. A rate is a measure of non-pictorial information overhead. A particular measure of rate may be defined as a number of bits of storage required for macroblock overhead. Other measures of rate may be suitable in accordance with the present invention Distortion is an approximation of how much pictorial information must be stored. For example, as more of the picture information in the current differs from the previous video frame, more picture information must be stored. The goal of the motion search is to find the motion vectors and block size that minimizes the RD for each macroblock as applied to the current video frame. There are many measures of distortion known in the art. A preferred measure of distortion in accordance with the present invention is a sum of absolute differences as defined in Eq. (1) above. However, any suitable measure of distortion may be used with the inventive block size heuristic of the present invention.

Referring again to FIG. 2A, if the 8×16 or 16×8 block size has a lower rate-distortion, then, fine-grain motion is taking place 204. However, the level of granularity is still undetermined and further processing must take place. In other words, smaller block sizes must be motion searched.

Method 200 may then include performing 206 a motion search for the 8×8 block size and calculating a RD for the 8×8 block size. If the 8×8 block size has a smaller RD than the previous larger block sizes 208, then the search must be continued because the level of granularity is still uncertain. Alternatively, if the RD of the 8×8 block size is larger than that of the previous larger block sizes, the block size with lowest RD has been found.

Method 200 may also include performing 210 a motion search for the 4×8 and 8×4 block sizes and calculating corresponding RDs. If one of the 4×8 or 8×4 block sizes has a smaller RD than a previous larger block size, the granularity remains uncertain and the search continues. Alternatively, if the RD of the 4×8 or 8×4 block sizes is larger than that of the previous larger block sizes, the block size with lowest RD has been found 216. Method 200 may also include performing 214 a motion search on the 4×4 block size. At this point a RD has been calculated for all block sizes and the block size with the lowest RD has been found 216.

In accordance with the present invention, only the solution with the lowest RD is kept and used for further processing in accordance with the method 100 of compressing a video image. A benefit of this technique is that, in most cases, the 16×16 block size is optimal. Therefore, only the 16×16, 8×16, and 16×8 block sizes must be searched in most cases i.e., three out of the seven available block sizes. This may provide a major performance boost.

An alternative method of motion searching in accordance with the present invention may include selecting one of a plurality of available block sizes to obtain a selected block size, performing a motion search using the selected block size and calculating and storing a rate-distortion for the selected block size. The method may further include determining whether a lowest rate-distortion block size has been found, if not, continuing to search by selecting a next smallest block size if one exists and repeating above starting from performing a motion search using said selected block size.

Figure 3:
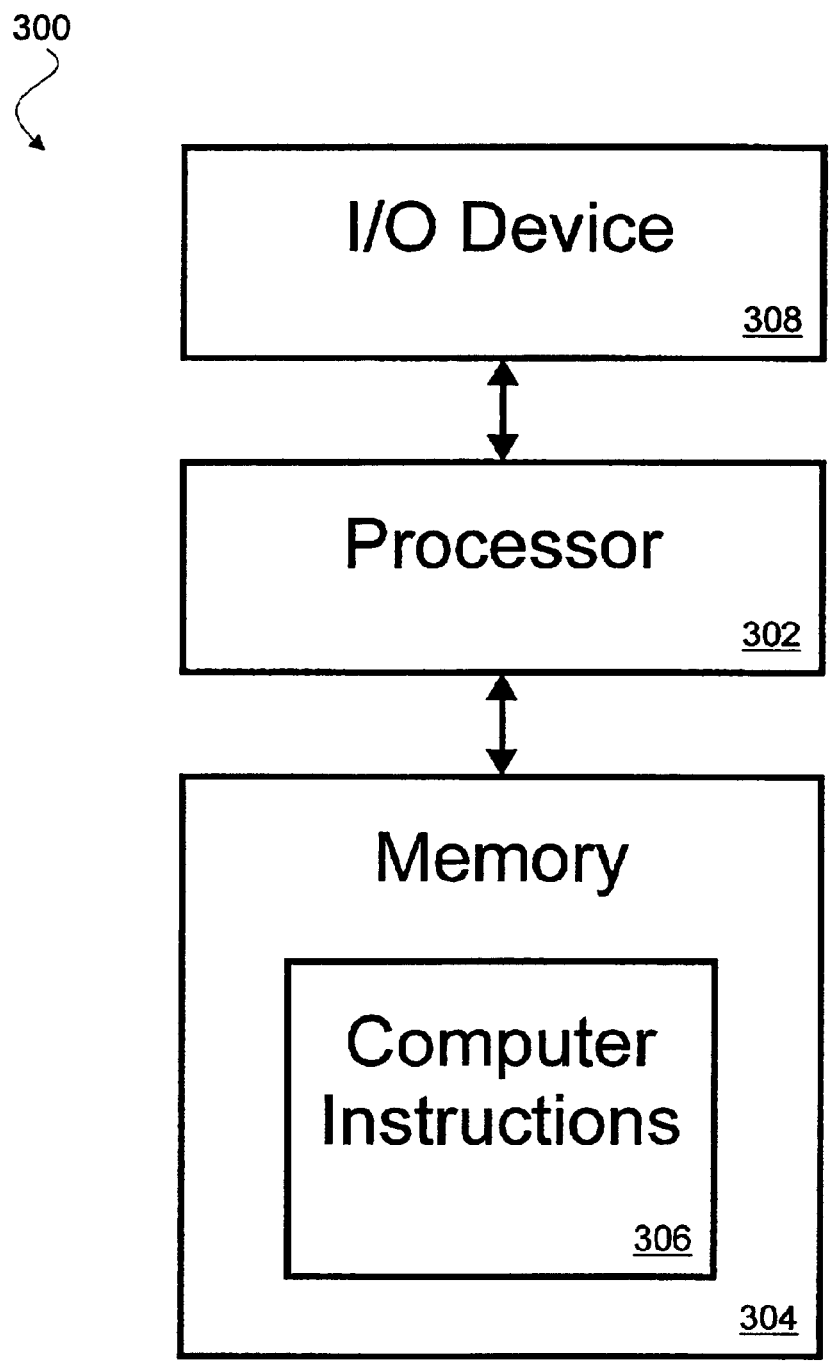
FIG. 3 is a block diagram of a system for compressing and decompressing images in accordance with the present invention.

FIG. 3 is a block diagram of a system 300 for compressing and decompressing images in accordance with the present invention. System 300 may be configured to implement methods 100 or 200 or both. System 300 may be configured for transmitting and receiving video images. System 300 may be a video conferencing system, for example and not by way of limitation, Sorenson Video 3, available from Sorenson Media, 4393 South Riverboat Road, Suite 300, Salt Lake City, Utah 84123. System 300 may be configured for communication over a network (not shown for clarity). System 300 may include a processor 302 configured for processing computer instructions 306 and a memory 304 for storing computer instructions 306.

Computer instructions 306 may be in the form of a computer program. System 300 may include computer instructions 306 implementing a method for compressing motion video images. The method may be method 100 as described above. The method may include inputting a video frame, performing a motion search on the video frame, computing the change between the video frame and a previous video frame not taking into account motion and storing a motion vector for each block in the video frame and the computed change.

Although this invention has been described with reference to particular embodiments, the invention is not limited to these described embodiments. Rather, the invention is limited only by the appended claims, which include within their scope all equivalent devices or methods that operate according to the principles of the invention as described herein.

What is claimed is:

1. A method for motion searching each macroblock of a video frame, comprising iteratively decreasing block size until a rate-distortion (RD) has been minimized and selectively reducing the number of block sizes searched, wherein said motion searching each block of said video frame comprises:

performing a motion search on said video frame relative to a previous video frame using 16×16, 8×16 and 16×8 block sizes';

calculating a rate-distortion (RD) for each of said 16×16, 8×16 and 16×8 block sizes;

if said calculated RD is lowest for said 16×16 block size, motion search is complete, otherwise continue;

performing a motion search on said video frame relative to said previous video frame using an 8×8 block size;

calculating a RD for said ×8 block size;

if said calculated AD for said 8×8 block size is not lower than said calculated RD for said said 16×16, 8×16 and 16×8 block sizes then said motion search is complete, otherwise continue;

performing a motion search on said video frame relative to said previous video frame using 4×8 and 8×4 block sizes;

calculating a RD for said 4×8 and 8×4 block sizes;

if neither of said calculated RDs for said 4×8 and 8×4 block sizes is lower than said calculated RD for said 16×16, 8×16, 16×8 and 8×8 block sizes, then said motion search is complete, otherwise continue;

performing a motion search on said video frame relative to said previous video frame using a 4×4 block size; and determining a block size with lowest calculated RD and motion search is complete.

2. The method of claim 1, wherein said motion searching each block of said video frame comprises:

selecting a largest of a plurality of available block sizes to obtain a selected block size;

performing a motion search using said selected block size;

calculating and storing a rate-distortion (RD) for said selected block size;

comparing said RD for said selected block size with a RD for a larger block size if one exists;

if the RD for said selected block is larger than said RD for said larger block size then a lowest RD block size has been found, if not, continuing;

selecting a smaller block size if one exists; and repeating above starting from performing a motion search using said selected block size.

3. The method of claim 1, further comprising repeating all steps for a new video frame.

4. The method of claim 1, wherein said RD comprises:

$$RD = n(\text{rate}) + m(\text{distortion})$$

where n and m are scalar values.

5. The method of claim 4, wherein rate comprises a number of bits of storage required for macroblock overhead.

6. The method of claim 4, wherein distortion comprises a sum of absolute differences.

7. A method for compressing motion video images comprising:
   inputting a video frame;
   performing a motion search on each macroblock of said video frame including iteratively decreasing block size until a rate-distortion (RD) has been minimized;
   storing a motion vector for each block in said video frame; and
   residual coding of motion compensated errors, wherein said performing said motion search on each macroblock of said video frame comprises:
   performing a motion search on said video frame relative to a previous video frame using 16×16, 8×16 and 16×8 block sizes;
   calculating a rate-distortion (.RD) for each of said16×16, 8×16 and 16×8 block sizes;
   if said calculated RD is lowest for said 16×16 block size, motion search is complete, otherwise continue,
   performing a motion search on said video frame relative to said previous video frame using an 8×8 block size;
   calculating a RD for said 8×8 block size;
   if said calculated RD for said 8×8 block size is not lower than said calculated RD for said said 16×16, 8×16 and 16×8 block sizes then said motion search is complete, otherwise continue;
   performing a motion search on said video frame relative to said previous video frame using 4×8 and 8×4 block sizes;
   calculating a RD for said 4×8 and 8×4 block sizes;
   if neither of said calculated AI)s for said 4×8 and 8×4 block sizes is lower than said calculated RD for said 16×16, 8×16, 16×8 and 8×8 block sizes, then said motion search is complete, otherwise continue;
   performing a motion search on said video frame relative to said previous video frame using a 4×4 block size; and
   determining a block size with lowest calculated RD and motion search is complete.

8. The method of claim 7, further comprising repeating all steps for a new video frame.

9. The method of claim 7, wherein said performing said motion search on each macroblock of said video frame further comprises:
   selecting a largest of a plurality of available block sizes to obtain a selected block size;
   performing a motion search using said selected block size;
   calculating and storing a rate-distortion (RD) for said selected block size;
   comparing said RD for said selected block size with a RD for a larger block size if one exists;
   if the RD for said selected block is larger than said RD for said larger block size then a lowest RD block size has been found, if not, continuing;
   selecting a smaller block size if one exists; and
   repeating above starting from performing a motion search using said selected block size.

10. The method of claim 7, wherein said RD comprises:

$$RD = n(\text{rate}) + m(\text{distortion})$$

where n and m are scalar values.

11. The method of claim 10, wherein rate comprises a number of bits of storage required for macroblock overhead.

12. The method of claim 10, wherein distortion comprises a sum of absolute differences.

13. A system for transmitting and receiving video images, comprising:
   a processor configured for processing computer instructions and a memory for storing said computer instructions; and
   wherein said computer instructions implement a method for compressing motion video images, comprising:
   inputting a video frame;
   performing a motion search on each macroblock of said video frame including iteratively decreasing block size until a rate-distortion (RD) has been minimized;
   storing a motion vector for each block in said video frame; and
   residual coding of motion compensated errors, wherein said performing said motion search on each macroblock of said video frame further comprises:
   performing a motion search on said video frame relative to a previous video frame using 16×16, 8×16 and 16×8 block sizes;
   calculating a rate-distortion (#D) for each of said 16×16, 8×16 and 16×8 block sizes;
   if said calculated .RD is lowest for said 16×16 block size, motion search is complete, othenvise continue;
   performing a motion search on said video frame relative to said previous video frame using an 8×8 block size;
   calculating a RD for said 8×8 block size;
   if said calculated .RD for said 8×8 block size is not lower than said calculated RD for said said 16×16, 8×16 and 16×8 block sizes then said motion search is complete, othenvise continue;
   performing a motion search on said video frame relative to said previous video frame using 4×8 and 8×4 block sizes';
   calculating a SD for said 4×8 and 8×4 block sizes;
   if neither of said calculated RD's for said 4×8 and 8×4 block sizes is lower than said calculated RD for said16×16, 8×16, 16×8 and 8×8 block sizes, then said motion search is complete, otherwise continue;
   performing a motion search on said video frame relative to said previous video frame using a 4×4 block size; and
   determining a block size with lowest calculated RD and motion search is complete.

14. The system of claim 13, wherein said performing said motion search on each macroblock of said video frame further comprises:
   selecting a largest of a plurality of available block sizes to obtain a selected block size;
   performing a motion search using said selected block size;
   calculating and storing a rate-distortion (RD) for said selected block size;
   comparing said RD for said selected block size with a RD for a larger block size if one exists;

if the RD for said selected block is larger than said RD for said larger block size then a lowest RD block size has been found, if not, continuing;

selecting a smaller block size if one exists; and repeating above starting from performing a motion search using said selected block size.

15. The system of claim 13, wherein said RD comprises:

$$RD=n(\text{rate})+m(\text{distortion})$$

where n and m are scalar values.

16. The system of claim 15, wherein rate comprises a number of bits of storage required for macroblock overhead.

17. The system of claim 15, wherein distortion comprises a sum of absolute differences.

18. The system of claim 13, further comprising an input device in communication with said processor for capturing video images.

19. The system of claim 13, wherein said system is further configured to communicate over a network.

* * * * *

UNITED STATES PATENT AND TRADEMARK OFFICE
CERTIFICATE OF CORRECTION

PATENT NO. : 6,909,748 B2  Page 1 of 1
APPLICATION NO. : 10/029142
DATED : June 21, 2005
INVENTOR(S) : Jonathan J. Dinerstein It is certified that error appears in the above-identified patent and that said Letters Patent is hereby corrected as shown below:

CLAIM 1, COLUMN 6, LINE 34, change "said x8 block" to --said 8x8 block--
CLAIM 1, COLUMN 6, LINE 36, change "for said said 16x16," to --for said 16x16,--
CLAIM 7, COLUMN 7, LINE 27, change "(.RD)" to --(RD)-- and change "said 16x16," to --said 16x16,--
CLAIM 7, COLUMN 7, LINE 30, change "continue," to --continue;--
CLAIM 13, COLUMN 8, LINE 32, change "(#D)" to --(RD)--
CLAIM 13, COLUMN 8, LINE 34, change ".RD" to --RD--
CLAIM 13, COLUMN 8, LINE 35, change "othenvise" to --otherwise--
CLAIM 13, COLUMN 8, LINE 40, change ".RD" to --RD--
CLAIM 13, COLUMN 8, LINE 41, change "for said said 16x16," to --for said 16x16,--
CLAIM 13, COLUMN 8, LINE 43, change "othenvise" to --otherwise--
CLAIM 13, COLUMN 8, LINE 47, change "a SD" to --a SAD--
CLAIM 13, COLUMN 8, LINE 50, change "said16x16," to --said 16x16,--

Signed and Sealed this

Twenty-fifth Day of December, 2007

JON W. DUDAS
*Director of the United States Patent and Trademark Office*